United States Patent
Daneshvaran et al.

(10) Patent No.: US 11,530,051 B2
(45) Date of Patent: Dec. 20, 2022

(54) NOISE-REDUCING AIRCRAFT LANDING GEAR TOW BAR FITTING

(71) Applicant: The Boeing Company, Chicago, IL (US)

(72) Inventors: Navid Daneshvaran, Mukilteo, WA (US); Takao Suzuki, Mill Creek, WA (US); Nicholas J. Moffitt, St. Peters, MO (US); Nicholas Toon, Kirkland, WA (US); Michael Lewis McGillivray, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 258 days.

(21) Appl. No.: 16/893,028

(22) Filed: Jun. 4, 2020

(65) Prior Publication Data

US 2021/0380276 A1     Dec. 9, 2021

(51) Int. Cl.
*B64F 1/22*     (2006.01)
*B64C 25/60*    (2006.01)

(52) U.S. Cl.
CPC .............. *B64F 1/224* (2013.01); *B64C 25/60* (2013.01)

(58) Field of Classification Search
CPC .. B64F 1/224; B64F 1/04; B64F 1/002; B64C 25/60
See application file for complete search history.

(56) References Cited

U.S. PATENT DOCUMENTS

| | | | |
|---|---|---|---|
| 7,484,688 B2 | 2/2009 | Chow et al. | |
| 8,302,906 B2 | 11/2012 | Chow et al. | |
| 2009/0321559 A1* | 12/2009 | Chow | B64C 25/001 244/1 N |
| 2011/0073388 A1* | 3/2011 | Andres | B64F 1/22 244/50 |
| 2012/0326894 A1* | 12/2012 | Schmidt | B64F 1/224 340/960 |

OTHER PUBLICATIONS

Shen, S., et al., "Extended Boltzmann Kinetic Equation for Turbulent Flows," Science, vol. 301, Issue 5633, Aug. 1, 2003, 4 pages.
Haller, G., "An objective definition of a vortex," J. Fluid Mech, vol. 525, pp. 1-26, 2005, 26 pages.
Dubief, Y., et al., "On coherent-vortex identification in turbulence," Journal of Turbulence, Dec. 18, 2000, 22 pages.
Chen, S., et al., "Lattic Boltzmann Method for Fluid Flows," Annual Review Fluid Mech. 1998, 36 pages.

(Continued)

*Primary Examiner* — Rodney A Bonnette
(74) *Attorney, Agent, or Firm* — Alleman Hall Creasman & Tuttle LLP

(57) ABSTRACT

A tow bar fitting for towing an aircraft is disclosed. The tow bar fitting includes a mount, a pin support, and a tow pin. The mount includes an upper attachment and a lower attachment for affixing the tow bar fitting to a landing gear of the aircraft. The pin support extends from the mount away from the landing gear. The tow pin is positioned in the pin support such that a tow pin plane that horizontally bisects the tow pin is lower than a mount plane that horizontally bisects the upper attachment and the lower attachment when the aircraft is right-side-up on the ground.

20 Claims, 9 Drawing Sheets

(56) References Cited

OTHER PUBLICATIONS

Julian Herzog, "Airbus A380 Nose Landing Gear.jpg," Sep. 12, 2012, 4 pages.
"Main Line Aircraft Towbar Attach Fitting Interface," SAE International, Aug. 1, 1981, 5 pages.
Dobrzynski, W. et al., "Research into Landing Gear Airframe Noise Reduction," Proceedings from 8th AIAA/CEAS Aeroacoustics Conference & Exhibit, Breckenridge, Colorado, Jun. 17, 10 pages.
Ricciardi, T. et al., "An assessment of high-fidelity flow simulation methodologies for noise prediction of realistic landing gear configurations," Proceedings from AIAA SciTech Forum, San DIego, California, Jan. 7, 2019, 13 pages.
Takaishi, T. et al., "Noise Reduction Design for Landing Gear toward FQUROH Flight Demonstration," Proceedings from AIAA Aviation Forum, Denber, Colorado Jun. 5, 2017, 16 pages.
Yamamoto, K. et al., "FQUROH: A Flight Demonstration Project for Airframe Noise Reduction Technology—Concept and Current Status," Proceedings from 22nd AIAA/CEAS Aeroacoustics Conference, Lyon, France, May 30, 2016, 10 pages.
Yamamoto, K. et al., "FQUROH: A Flight Demonstration Project for Airframe Noise Reduction Technology—the 2nd Flight Demonstration," Proceedings from 2018 AIAA/CEAS Aeroacoustics Conference, Jun. 25, 2018, Atlanta Georgia, 14 pages.
Schlichting, H., "Boundary-Layer Theory," 7th Edition, Jan. 1, 1979, pp. 28-38.
Shur, M. et al., "Detached-eddy simulation of an airfoil at high angle of attack," Engineering Turbulence Modelling and Experiements, 1999, 10 pages.
Spalart, P. et al., "A one-equation turbulence model for aerodynamic flows," Proceedings of the AIAA 30th Aerospace Sciences Meeting and Exhibit, Jan. 6, 1992, Reno, NV, 17 pages.
Ffowcs Williams, J. et al., "Sound generated by turbulence an Lsueases.narbitrary motion," Philosophical transactions of the Royal Society of London, vol. 264, No. 1151, May 8, 1969, 33 pages.

* cited by examiner

NOISE-REDUCING AIRCRAFT LANDING GEAR TOW BAR FITTING

FIELD

The present disclosure relates generally to the field of aircraft, and more specifically to a tow bar fitting for a landing gear of an aircraft.

BACKGROUND

Although many aircraft are capable of self-propulsion on the ground using thrust, the resulting jet blast or prop wash may be inefficient or otherwise undesirable for some movement scenarios. An aircraft may be towed on the ground by an external power source, such as a special-purpose, low-profile vehicle referred to as a tug in scenarios where self-propulsion is less desirable. A tug may be mechanically coupled to an aircraft via a tow bar. In particular, the tow bar may be coupled to a tow bar fitting positioned on a landing gear of the aircraft.

A conventional tow bar fitting for a landing gear of an aircraft may be configured such that a tow pin extends horizontally from a vertically oriented strut of the landing gear when the landing gear is in a lowered position, such as when the aircraft is landed on flat ground. In particular, the tow bar fitting may be positioned in between a pair of wheels that couple to the strut via an axle, such that a tow bar may be coupled to the tow pin for towing the aircraft. Furthermore, the tow pin may be vertically centered relative to a mount that fastens the tow bar fitting to the strut. By positioning the tow pin in the center of the tow bar fitting in this manner, load transfer through the tow bar fitting to the strut may be optimized and a weight of the tow bar fitting may be reduced relative to other configurations where the tow pin is located in a different position.

However, such a tow bar fitting may cause audible noise issues when the aircraft is traveling with the landing gear in the lowered position, such as during take-off and landing. In particular, since the tow bar fitting is positioned in front of the landing gear between the wheels, and the tow pin is positioned in the middle of the tow bar fitting, shear layers originating from the airflow separated from the top/bottom surfaces of the tow pin form vortex shedding that impinges upon a front face of the tow bar fitting. Such impingement of vortex shedding airflow on the front face of the tow bar fitting and/or other portions of the landing gear is believed to generate an audible tone. This audible tone may significantly increase an operational noise level of the aircraft during take-off and landing.

SUMMARY

A tow bar fitting for towing an aircraft is disclosed. The tow bar fitting includes a mount, a pin support, and a tow pin. The mount includes an upper attachment and a lower attachment for affixing the tow bar fitting to a landing gear of the aircraft. The pin support extends from the mount away from the landing gear. The tow pin is positioned in the pin support such that a tow pin plane that horizontally bisects the tow pin is lower than a mount plane that horizontally bisects the upper attachment and the lower attachment when the aircraft is right-side-up on the ground.

The features that have been discussed can be achieved independently in various embodiments or may be combined in yet other embodiments further details of which can be seen with reference to the following description and drawings.

DETAILED DESCRIPTION

The present description is directed to various configurations for a tow bar fitting for towing an aircraft, having noise reducing characteristics. In these configurations, the tow bar fitting includes a mount, a pin support, and a tow pin. The pin support extends from the mount away from the landing gear. The tow pin is positioned in the pin support such that a tow pin plane that horizontally bisects the tow pin is lower than a mount plane that horizontally bisects the mount. By lowering the tow pin relative to the upper and lower attachments of the tow bar fitting such that the tow pin plane is below the mount plane, a majority of vortex shedding airflow flowing around the tow pin generated responsive to forward movement of the aircraft may flow underneath the tow bar fitting and the strut of the landing gear. In this way, audible noise may be reduced relative to a conventional tow pin that is horizontally centered between the upper and lower attachments when the aircraft is traveling with the landing gear in the lowered position, such as during take-off and landing.

It will be appreciated that directional terms (e.g., above vs. below, higher vs. lower, upper vs. lower) in this description are with reference to an airplane that is right-side-up on the ground. As an example, the landing gear wheels, which make contact with the ground when an airplane is right-side-up on the ground, are lower than the cabin, which is held above the ground by the landing gear. These relative terms apply with this frame of reference (i.e., right-side-up airplane on ground), regardless of the current position of the airplane (e.g., upside-down airplane doing barrel roll).

Figure 1:
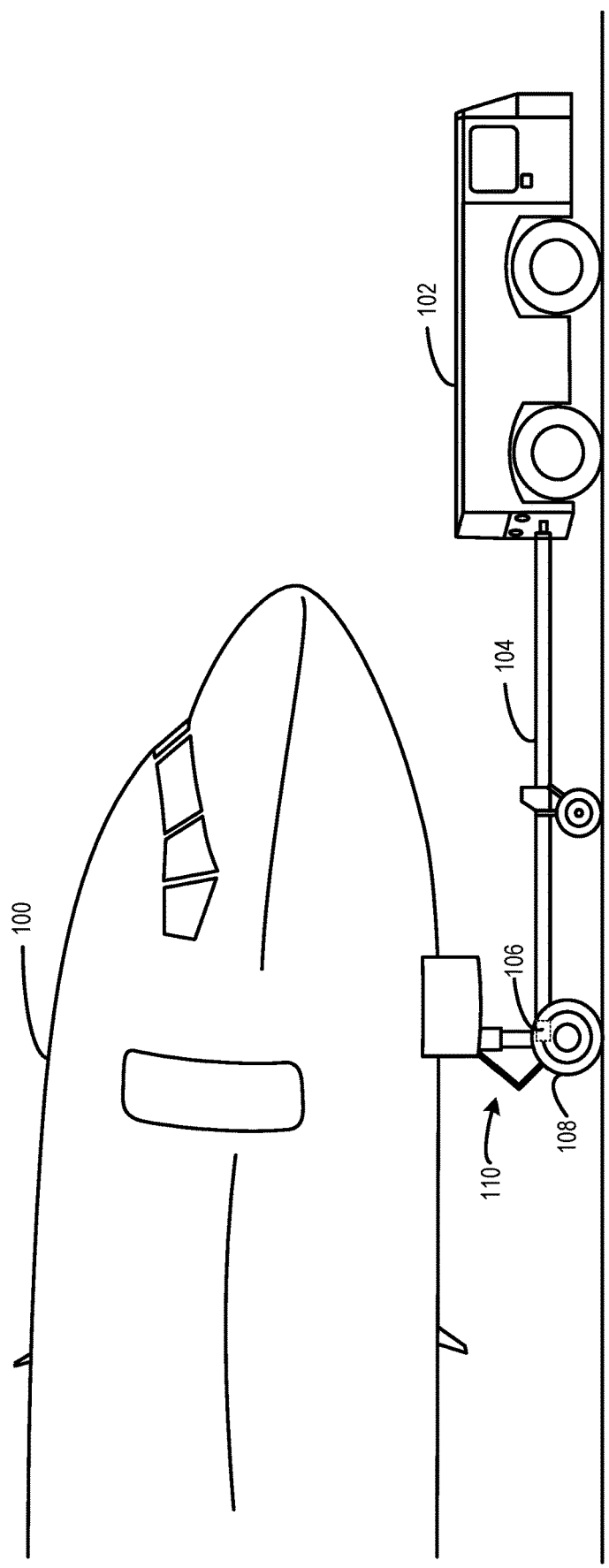
FIG. 1 shows an example embodiment of an aircraft coupled to a tug via a tow bar.

FIG. 1 shows an exemplary aircraft 100 being towed by a tug 102 during taxiing. The aircraft 100 is mechanically coupled to the tug 102 via a tow bar 104. In particular, the tow bar 104 is coupled to a tow bar fitting 106 (shown in FIG. 2) positioned in between a pair of wheels 108 of a nose landing gear 110 of the aircraft 100. The tow bar 104 is fixed to the tow bar fitting 106 laterally and is able to pivot vertically to allow for height adjustment of the tow bar 104. At the opposing end of the tow bar 104 that attaches to the tug 102, the tow bar 104 is able to pivot both laterally and vertically to accommodate movement of the tug 102 relative to the aircraft 100.

Figure 2:
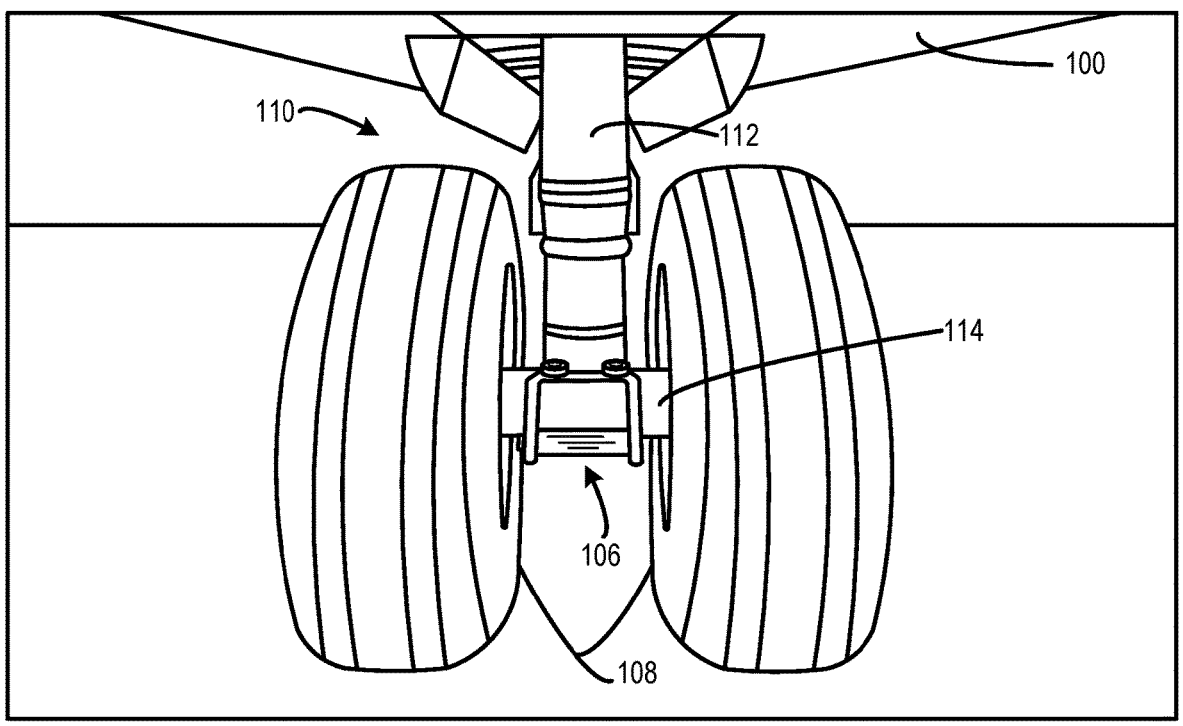
FIG. 2 shows an example embodiment of a nose landing gear of an aircraft including a tow bar fitting.

FIG. 2 shows a front view of the nose landing gear 110 in the lowered position below the aircraft 100, such that the pair of wheels 108 is resting on flat ground. The nose landing gear 110 includes a strut 112 that is vertically oriented when the nose landing gear 110 is in the lowered position. An axle 114 is positioned proximate to the bottom of the strut 112. The axle 114 extends laterally away from the strut 112 and is configured to support the pair of wheels 108. The tow bar fitting 106 is fastened proximate to the bottom of the strut 112 such that the tow bar fitting 106 is positioned in between the pair of wheels 108. The tow bar fitting 106 is positioned on the strut 112 to facilitate efficient load transfer from a connected tow bar (e.g., the tow bar 104 shown in FIG. 1), through the tow bar fitting 106, to the strut 112. When the aircraft 100 is traveling with the nose landing gear 110 in the lowered position, the pair of wheels 108 form a channel that directs airflow toward the tow bar fitting 106. Such airflow may be a source of potential audible noise. The tow bar fitting 106 is configured to mitigate such noise as discussed herein.

Figure 3:
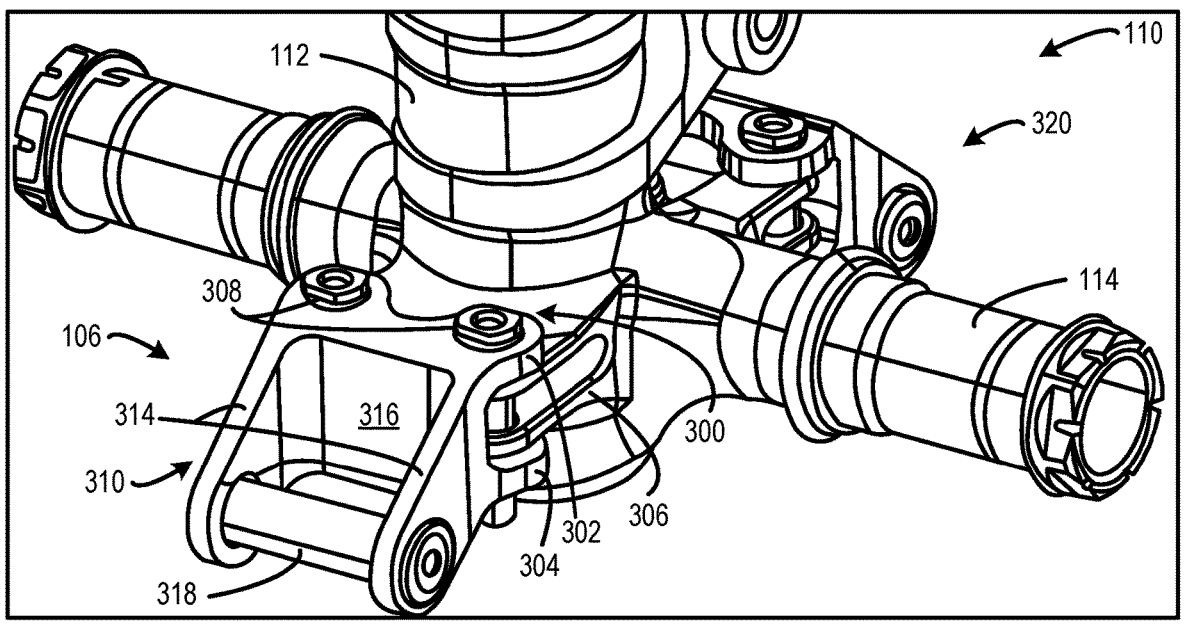
FIG. 3 shows the nose landing gear of FIG. 2 with tires removed to provide a more detailed view of the tow bar fitting.

FIG. 3 shows the nose landing gear 110 with the wheels removed from the axle 114. The tow bar fitting 106 is fastened to the strut 112 of the nose landing gear 110 via a mount 300. The mount 300 includes an upper attachment 302 and a lower attachment 304 that is vertically spaced apart from the upper attachment 302. The strut 112 includes an anchor beam 306 that extends between the upper attachment 302 and the lower attachment 304. The upper attachment 302, the anchor beam 306, and the lower attachment 304 form coaxially aligned apertures cooperatively configured to receive a pair of vertical fasteners 308 (e.g., bolts) configured to fasten the tow bar fitting 106 to the strut 112.

The tow bar fitting 106 includes a pin support 310 that extends from the mount 300 at a downward angle away from the strut 112. In the illustrated embodiment, the pin support 310 includes a clevis having a U-shape. In particular, the pin support 310 includes a pair of prongs 314 that extend from a front face 316 of the mount 300 at a downward angle relative to the mount 300. The pair of prongs 314 form tow pin apertures at terminal ends of the prongs 314 that are coaxially aligned and configured to accept a tow pin 318. The tow pin 318 may be secured in the tow pin apertures of the pin support 310 in any suitable manner. As one example, the tow pin 318 may be secured in the pin support 310 via a hitch pin (not shown). Since the pin support 310 is angled downward relative to the mount 300, the tow pin 318 is positioned in the pin support 310 such that a majority of vortex shedding airflow passing around (e.g., over, under) the tow pin flows under a bottom of the tow bar fitting 106 as well as a bottom of the strut 112. In other words, by lowering the tow pin 318 relative to the mount 300 and the strut 112, vortex shedding airflow generated responsive to forward movement of the aircraft that would otherwise impinge on the front face 316 of the mount 300 and generate audible noise instead flows under the mount 300 and the strut 112. In this way, audible noise may be reduced when the aircraft is traveling with the nose landing gear 110 in the lowered position, such as during take-off and landing, such as compared with a conventional configuration in which the tow pin is level with the front face of the mount. The tow pin 318 may be lowered relative to the mount such that a majority of vortex shedding airflow will pass under the tow bar fitting 106 and/or strut 112 at all typical take-off and landing aircraft pitch angles.

The tow bar fitting 106 may be made of any suitable material having suitable material strength to satisfy load transfer requirements of the tow bar and the landing gear. Non-limiting examples of suitable material for constructing the tow bar fitting include metal (e.g., steel, titanium, aluminum) and composite materials.

In the illustrated embodiment, an auxiliary tow bar fitting 320 is fastened to an opposite side of the strut 112 relative to the tow bar fitting 106. The auxiliary tow bar fitting 320 may be coupled to a tow bar that is positioned behind the nose landing gear 110 underneath the aircraft 100. The tow bar may be connected to an external power source that moves the aircraft while being positioned behind the nose landing gear 110 instead of in front of the nose landing gear 110. For example, the auxiliary tow bar fitting may be used in scenarios where there is not enough forward clearance in front of the aircraft 100 to accommodate a tug or other external power source. In some embodiments, the auxiliary tow bar fitting 320 may be configured such that a tow pin plane that horizontally bisects the tow pin is aligned with a mount plane that horizontally bisects the mount of the auxiliary tow bar fitting 320. In other words, the tow pin may be vertically centered relative to the mount of the auxiliary tow bar fitting 320. In other embodiments, the auxiliary tow bar fitting 320 may be configured such that a tow pin plane that horizontally bisects the tow pin is below the mount plane that horizontally bisects the mount of the auxiliary tow bar fitting 320. In other words, the tow pin may be lowered relative to the mount of the auxiliary tow bar fitting 320. In some embodiments, the auxiliary tow bar fitting may be omitted from the landing gear 110. While FIG. 3 shows a front landing gear, tow bar fittings may be located on any landing gear, including rear landing gear.

In the illustrated embodiment, the tow bar fitting is removable from the strut of the landing gear such that differently configured tow bar fittings may be interchangeably fastened to the strut of the landing gear. Any suitable differently configured tow bar fitting having noise reducing characteristics may be fastened to the strut of the landing gear. For example, different tow bar fittings having different sized or shaped tow pins may be fastened to the strut of the landing gear. Such different tow pins may facilitate mating with differently configured tow bars. As one example, differently configured tow bars may be used in different regions of the world, and a particular tow bar fitting that is configured to mate with a particular tow bar may be fastened to an aircraft, such that when the aircraft travels to a particular region that employs the particular tow bar, the tow bar is able to mate with the tow bar fitting.

Figure 4:
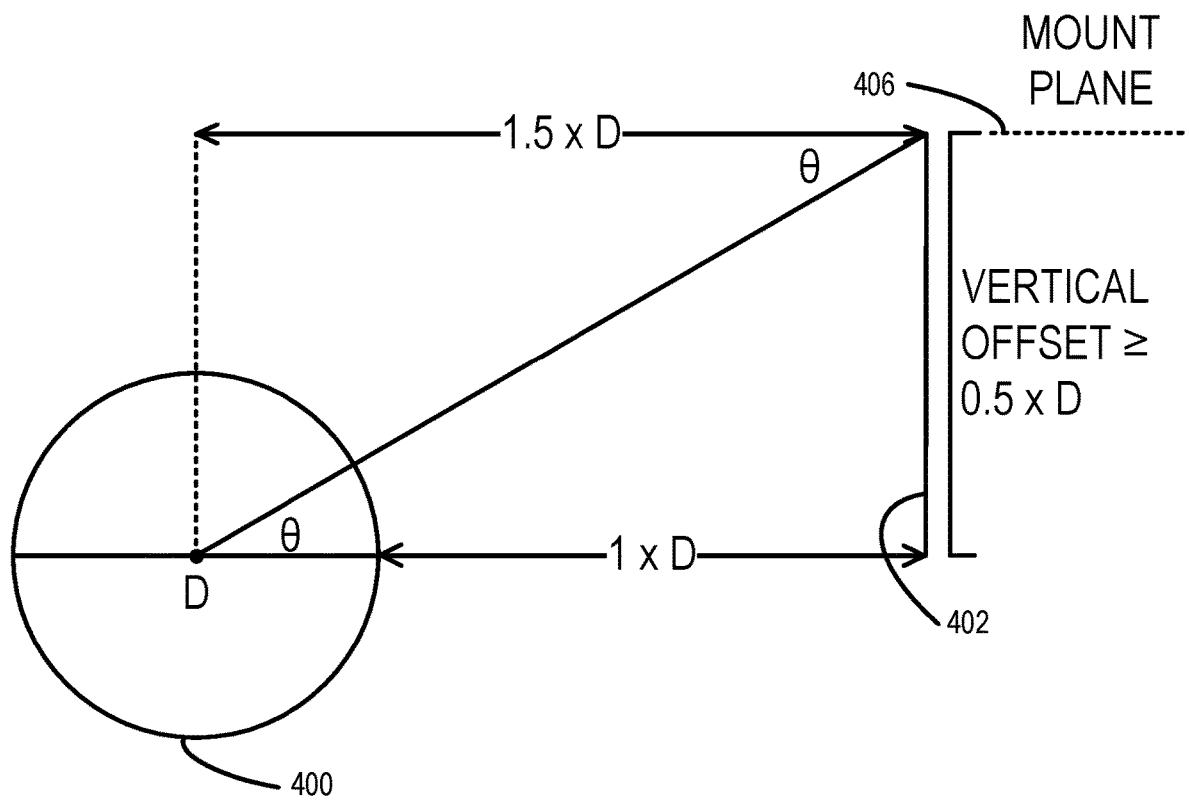
FIG. 4 shows a spatial relationship of components of an exemplary tow bar fitting.

In some embodiments, regulatory requirements may influence the design of the tow bar fitting. For example, SAE AS1614 requirements specify that a clear space envelope that surrounds the tow pin is required to be at least three times a diameter of the tow pin. FIG. 4 shows an example spatial relationship between an exemplary tow pin 400 and a front face 402 of a mount of a tow bar fitting based on the clear space envelope requirement. The front face 402 may correspond to the front face 316 of the tow bar fitting 106 shown in FIG. 3. The tow pin 400 has a diameter (D). The clear space envelope requirement can be restated such that a distance between a center of the tow pin 400 and the front face 402 of the mount is required to be one and a half times the diameter of the tow pin (i.e., 1.5×D) according to SAE AS1614. Alternatively, the clear space envelope requirement can be restated such that a distance between the nearest edge of the tow pin to the front face of the mount is required to be at least the diameter of the tow pin (i.e., 1×D) according to SAE AS1614. In order to comply with these requirements while providing noise reducing characteristics, the tow bar fitting may be configured such that the tow pin is vertically offset relative to a mount plane 406 that horizontally bisects the mount (e.g., half the distance between the upper attachment and the lower attachment of the mount) by at least half of the diameter of the tow pin (i.e., 0.5×D). Correspondingly, a downward angle (A) from a point where the mount plane 406 intersects the front face 402 to a center of the tow pin 400 may be at least:

$$\tan \theta = \frac{0.5D}{1.5D} = 0.33333$$
$$\theta = \tan^{-1} 0.33333$$
$$\theta = 18.435°$$

In other words, the downward angle (θ) is at least 18.435°. As one example, SAE AS1614 requirements specify that a Category II aircraft has a tow pin having a diameter of 1.75 inches. As such, the vertical offset for the corresponding tow pin fitting would be at least 0.5(1.75 in.)=0.875 in. The above described spatial relationship of the tow pin relative to the mount plane is provided as a non-limiting example. It will be appreciated that the above described spatial relationship of the tow pin relative to the mount plane may be applicable to a tow pin having any suitable diameter corresponding to any suitable category of aircraft.

The tow bar fitting may be configured to have any suitable vertical offset and any suitable downward angle (θ) without departing from the scope of the present disclosure. In some examples, the tow pin may have a vertical offset of at least 1 inch. In other examples, the tow pin may have a vertical offset of at least 2 inches. In some examples, the downward angle (θ) may be at least 20°. In some examples, the downward angle (θ) may be in a range of 20°-30°. More generally, wind tunnel or other testing may be used to measure vortex shedding airflow and/or audible tone resulting therefrom, and a vertical offset may be set such that a desired level of audible tone is reduced for typical aircraft take-off and landing pitch angles and speeds relative to a conventional tow bar fitting configuration that is level with a front face of the mount.

Figure 5:
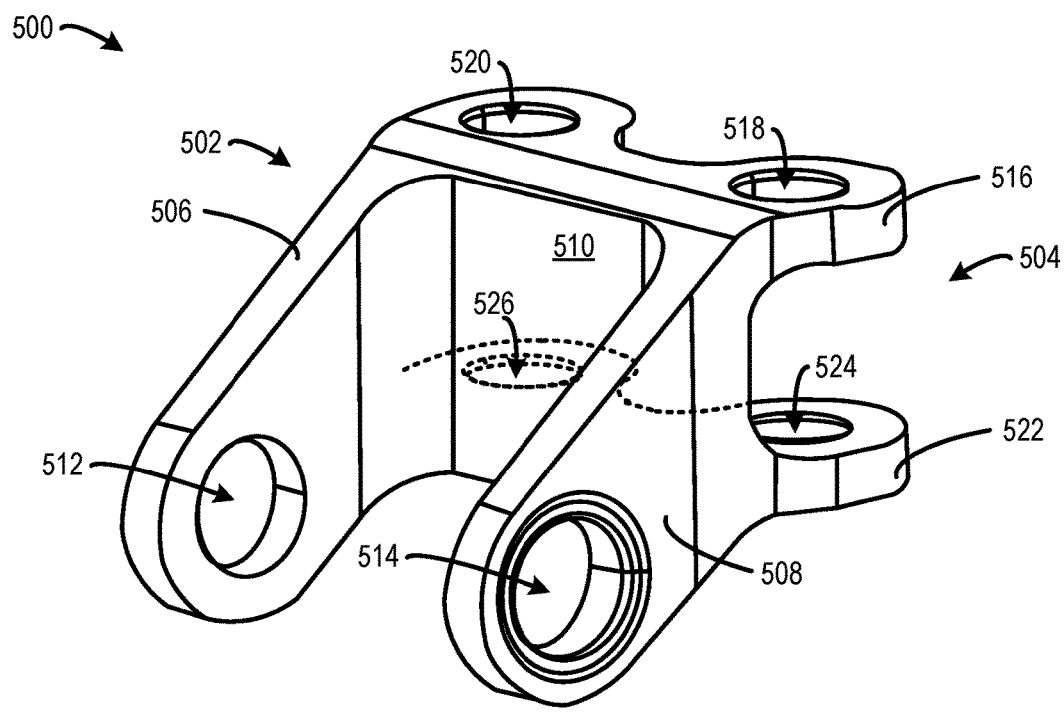
FIGS. 5-6 show an example embodiment of a tow bar fitting including a clevis and a mount including upper and lower attachments configured to receive vertical fasteners.
Figure 6:
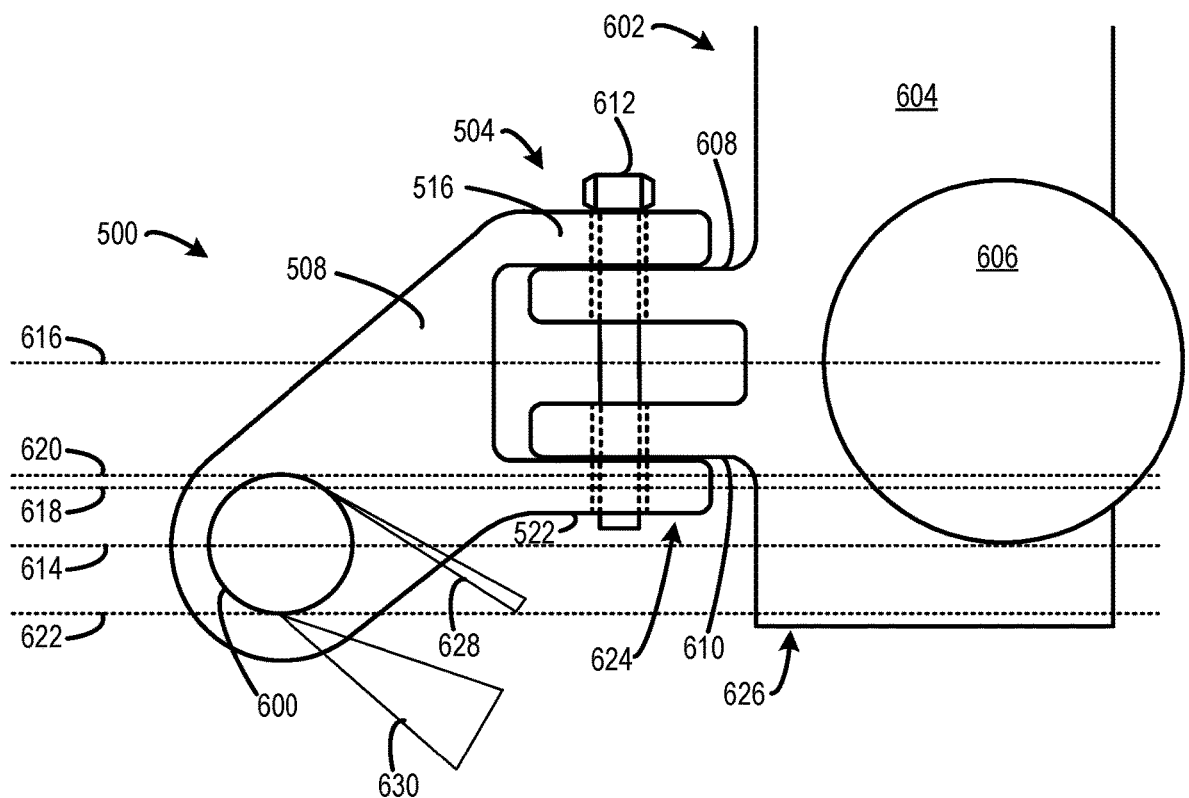

The tow bar fitting may be fastened to the strut of the landing gear in any suitable manner. FIGS. 5-12 show different embodiments of clevis-type tow bar fittings having different mounts. FIGS. 5-6 show an exemplary tow bar fitting 500 that is similar in function to the tow bar fitting 106 shown in FIG. 3. Features of the tow bar fitting 106 described in FIG. 3 are substantially the same as the tow bar fitting 500. In FIG. 5, the tow bar fitting 500 is shown separate from the strut of the landing gear. In FIG. 6, the tow bar fitting 500 is shown fastened to the strut of the landing gear. In the depicted example, the landing gear is shown in simplified form with a single forward-facing tow bar fitting, which differs from the configuration shown in FIG. 3 that includes forward- and rear-facing tow bar fittings.

The tow bar fitting 500 includes a clevis 502 and a mount 504 including upper and lower attachments configured to receive vertical fasteners. The clevis 502 acts as a pin support for a tow pin 600 (shown in FIG. 6). The clevis 502 is U-shaped and includes a first prong 506 and a second prong 508 that extend downward away from a front face 510 of the mount 504. A first tow pin aperture 512 is formed in a terminal end of the first prong 506 and a second tow pin aperture 514 is formed in a terminal end of the second prong 508. The first and second tow pin apertures 512, 514 are horizontally coaxially aligned and collectively configured to hold the tow pin 600 in the tow bar fitting 500.

The mount 504 includes an upper attachment 516 having a first upper aperture 518 and a second upper aperture 520 horizontally spaced apart from the first upper aperture 518. The mount 504 includes a lower attachment 522 vertically spaced apart from the upper attachment 516. The upper attachment 516 and the lower attachment 522 are parallel with each other. The lower attachment 522 forms a first lower aperture 524 and a second lower aperture 526 horizontally spaced apart from the first lower aperture 524. The first upper aperture 518 and the first lower aperture 524 are vertically spaced apart and coaxially aligned, such that the first upper aperture 518 and the first lower aperture 524 are collectively configured to receive a first vertical fastener 612 (shown in FIG. 6). The second upper aperture 520 and the second lower aperture 526 are vertically spaced apart and coaxially aligned, such that the second upper aperture 520 and the second lower aperture 526 are collectively configured to receive a second vertical fastener (not shown).

In FIG. 6, the tow bar fitting 500 is fastened to a landing gear 602. The landing gear 602 includes a strut 604. An axle 606 extends laterally way from the strut and is configured to support wheels rotatably coupled to the landing gear 602. The strut 604 includes an upper beam 608 and a lower beam 610 that extend perpendicular to the strut 604. The upper beam 608 and the lower beam 610 are vertically spaced apart such that the upper and lower beams are sandwiched in between the upper attachment 516 and the lower attachment 518. The upper and lower beams 608, 610 form apertures that align with the apertures formed in the upper and lower attachments 516, 522 of the tow bar fitting 500 such that vertical fasteners 612 can be inserted through the apertures to affix the tow bar fitting 500 to the landing gear 602. The vertical fasteners 612 may be retained in the upper and lower attachments in any suitable manner. As one example, the apertures in the upper and lower attachments 516, 522 may be threaded and the vertical fasteners 612 may have matching threads such that the vertical fasteners 612 rotatably couple to the upper and lower attachments 516, 522. When the tow bar fitting 500 is fastened to the landing gear 602, the upper and lower attachments 516, 522 are substantially parallel with the strut 604.

The tow bar fitting 500 is configured such that the first and second prongs 506, 508 of the clevis 502 extend from the mount 504 at a downward angle away from the landing gear 602. The tow pin 600 is positioned in the clevis 502 such that a tow pin plane 614 that horizontally bisects the tow pin 600 is lower than a mount plane 616 that horizontally bisects the upper attachment 516 and the lower attachment 522 of the mount 504. In the illustrated embodiment, the mount plane 616 also horizontally bisects the axle 606. In other embodiments, the mount plane 616 may be positioned above or below a center of the axle 606. Additionally, the tow pin 600 is positioned in the clevis 502 such that the tow pin plane 614 is lower than a lower attachment plane 618 that horizontally bisects the lower attachment 522. Further, the tow pin 600 is sized and positioned in the clevis 502 such that a top tow pin plane 620 tangent to a top of the tow pin 600 is lower than the mount plane 616, and a bottom tow pin plane 622 tangent to a bottom of the tow pin 600 is lower than the lower attachment plane 618. Stated another way, the tow pin plane 614 is vertically offset from the mount plane 616. The tow pin 600 may be positioned such that the tow pin plane 614 is vertically offset from the mount plane 616 by any suitable distance. In an example of a Category II aircraft having a ramp weight between 100,000-180,000 kilograms (220,000-400,000 pounds), such as Boeing® 757, 767, 777, 787 aircraft, it may be determined that a tow pin plane 614 that is at least 2 inches lower than the mount plane 616 may reduce noise sufficiently. However, it is to be understood lowering the tow pin plane 614 more or less is within the scope of this disclosure, and that any suitable amount of lowering may be selected based on a desired balance of noise reduction, weight, strength, and/or other factors.

The tow pin 600 is positioned such that a majority (i.e., greater than 50%) of vortex shedding airflow passing under the tow pin 600 generated responsive to forward movement of the aircraft flows under a bottom 624 of the tow bar fitting 500 and under a bottom 626 of the strut 604 of the landing gear 602 throughout all typical take-off and landing aircraft pitch angles and speeds. In particular, both a weak shear layer 628 created by airflow separating from a top surface of the tow pin 600 and a strong shear layer 630 created by airflow separating from a bottom surface of the tow pin 600 form vortex shedding that is directed below the bottom 624 of the mount 504 and the bottom 626 of the strut 604. In this way, impingement of the vortex shedding on the front face 510 of the mount 504 and the strut 604 is reduced relative to a conventional configuration in which the tow pin is level with the front face of the mount thereby reducing noise due to vortex shedding airflow. In some embodiments, it may be determined, e.g., via wind tunnel testing, that a desired level of noise reduction may be obtained by positioning the tow pin such that a majority of vortex shedding airflow passing under the tow pin will flow under a bottom of the tow bar fitting and/or under a bottom of a landing gear strut. In other embodiments, even greater noise reduction may be achieved by further lowering the tow pin such that an increased percentage of vortex shedding airflow flows under the tow bar fitting and/or landing gear strut (e.g., 60%, 75%, or even 100%).

Figure 7:
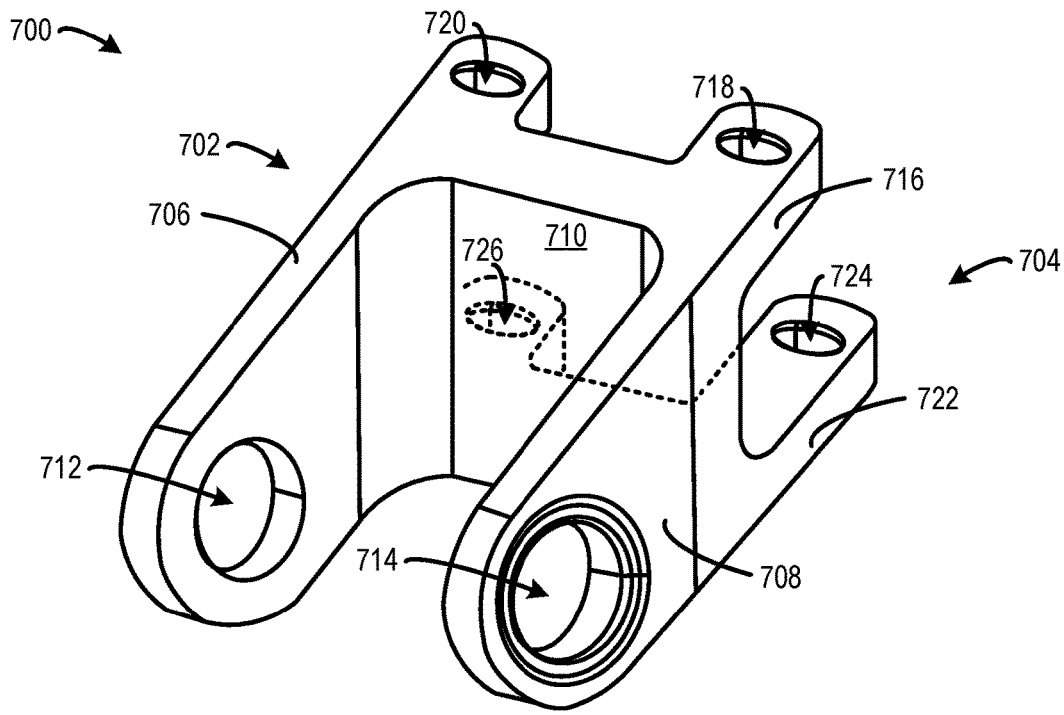
FIGS. 7-8 show an example embodiment of a tow bar fitting including a clevis and a mount including upper and lower attachments configured to receive angled vertical fasteners.
Figure 8:
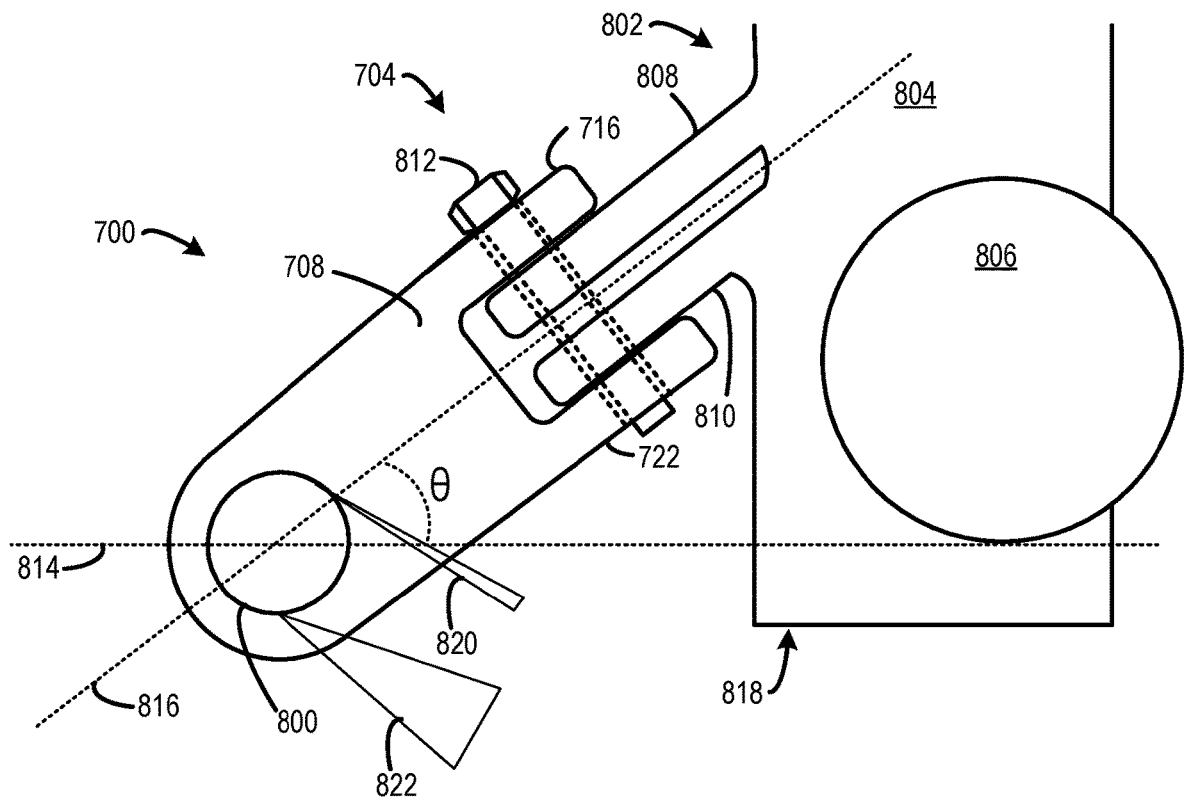

FIGS. 7-8 show another exemplary tow bar fitting 700 that is similar in function to the tow bar fitting 106 shown in FIG. 3 and/or the tow bar fitting 500 shown in FIGS. 5-6, but differs in that the tow bar fitting 700 is configured to fasten to an aircraft landing gear having angled attachments that are configured to receive angled vertical fasteners. Such angled attachments may be provided on different models of aircraft, and thus the tow bar fitting 700 may be specifically configured to fasten to these models of aircraft. In FIG. 7, the tow bar fitting 700 is shown separate from the strut of the landing gear. In FIG. 8, the tow bar fitting 700 is shown fastened to the strut of the landing gear. In the depicted example, the landing gear is shown in simplified form with a single forward-facing tow bar fitting. In other examples, forward- and rear-facing tow bar fittings may be fastened to the strut of the landing gear.

The tow bar fitting 700 includes a clevis 702 and a mount 704 including angled upper and lower attachments configured to receive angled vertical fasteners. The clevis 702 acts as a pin support for a tow pin 800 (shown in FIG. 8). The clevis 702 is U-shaped and includes a first prong 706 and a second prong 708 that extend away from a front face 710 of the mount 704. A first tow pin aperture 712 is formed in a terminal end of the first prong 706 and a second tow pin aperture 714 is formed in a terminal end of the second prong 708. The first and second tow pin apertures 712, 714 are horizontally coaxially aligned and collectively configured to hold the tow pin 800 in the tow bar fitting 700.

The mount 704 includes an upper attachment 716 having a first upper aperture 718 and a second upper aperture 720 horizontally spaced apart from the first upper aperture 718. The mount 704 includes a lower attachment 722 vertically spaced apart from the upper attachment 716. The lower attachment 722 forms a first lower aperture 724 and a second lower aperture 726 horizontally spaced apart from the first lower aperture 724. The first upper aperture 718 and the first lower aperture 724 are vertically spaced apart and coaxially aligned, such that the first upper aperture 718 and the first lower aperture 724 are collectively configured to receive a first vertical fastener 812 (shown in FIG. 8). The second upper aperture 720 and the second lower aperture 726 are vertically spaced apart and coaxially aligned, such that the second upper aperture 720 and the second lower aperture 726 are collectively configured to receive a second vertical fastener (not shown).

In FIG. 8, the tow bar fitting 700 is fastened to a landing gear 802. The landing gear 802 includes a strut 804. An axle 806 extends laterally way from the strut and is configured to support wheels rotatably coupled to the landing gear 802. The strut 804 includes an upper beam 808 and a lower beam 810 that extend at a downward angle away from the strut 804. The upper beam 808 and the lower beam 810 are parallel with each other. The upper beam 808 and the lower beam 810 are vertically spaced apart such that the upper and lower beams are sandwiched in between the upper attachment 716 and the lower attachment 722. The upper and lower beams 808, 810 form apertures that align with the apertures formed in the upper and lower attachments 716, 722 of the tow bar fitting 700 such that vertical fasteners 812 can be inserted through the apertures to affix the tow bar fitting 700 to the landing gear 802. When the tow bar fitting 700 is fastened to the landing gear 802, the upper and lower attachments 716, 722 are substantially parallel with the upper and lower beams 808, 810.

The tow bar fitting 700 is configured to fasten to the downward angled upper and lower beams 808, 810 of the strut 804 such that the first and second prongs 706, 708 of the clevis 702 extend from the mount 704 at a downward angle away from the landing gear 802. The tow pin 800 is positioned in the clevis 702 such that a tow pin plane 814 that horizontally bisects the tow pin 800 is vertically offset from the upper and lower beams 808, 810 of the strut 804. A beam plane 816 is coaxially aligned with the downward angled upper and lower beams 808, 810 of the strut 804 and extends through a center of the tow pin 800. The tow pin 800 is vertically offset such that a downward angle ($\theta$) between the beam plane 816 and the tow pin plane 814 is at least 18° for a Category II aircraft according to SAE AS1614.

The tow pin 800 is positioned such that a majority of vortex shedding airflow passing under the tow pin 800 generated responsive to forward movement of the aircraft flows under a bottom 818 of the strut 804 of the landing gear 802. In particular, both a weak shear layer 820 created by airflow separating from a top surface of the tow pin 800 and a strong shear layer 822 created by airflow separating from a bottom surface of the tow pin 800 form vortex shedding that is directed below the bottom 818 of the strut 804. In this way, impingement of the vortex shedding on the strut 804 is reduced relative to a conventional configuration in which the tow pin is level with the front face of the mount thereby reducing noise due to vortex shedding airflow.

Figure 9:
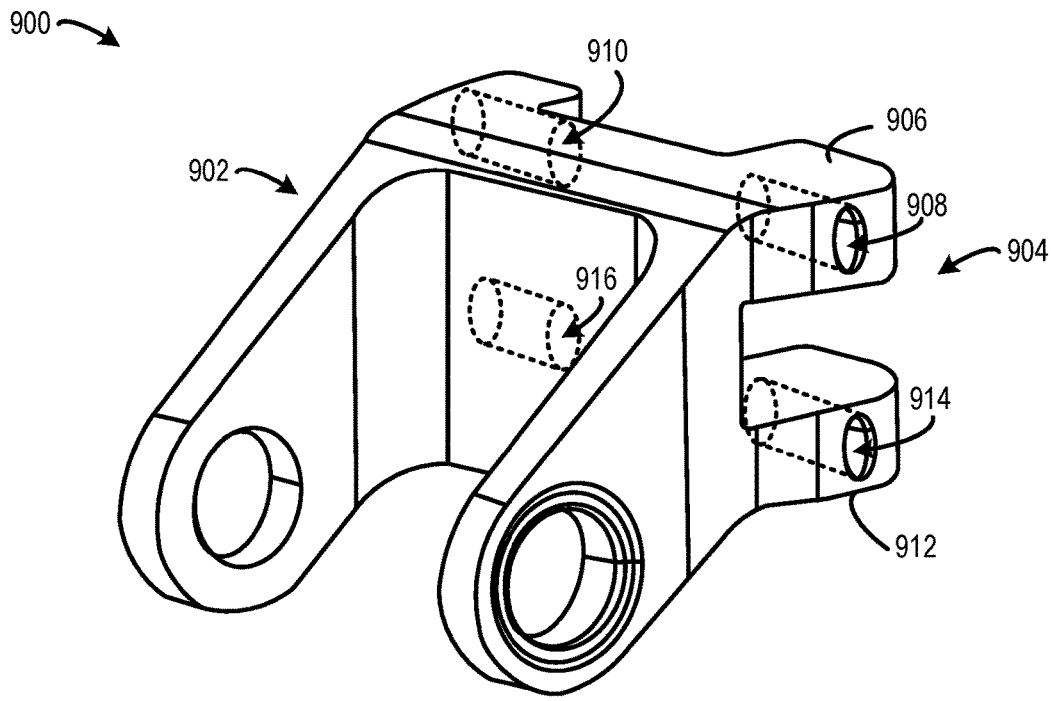
FIGS. 9-10 show an example embodiment of a tow bar fitting including a clevis and a mount including upper and lower attachments configured to receive horizontal fasteners.
Figure 10:
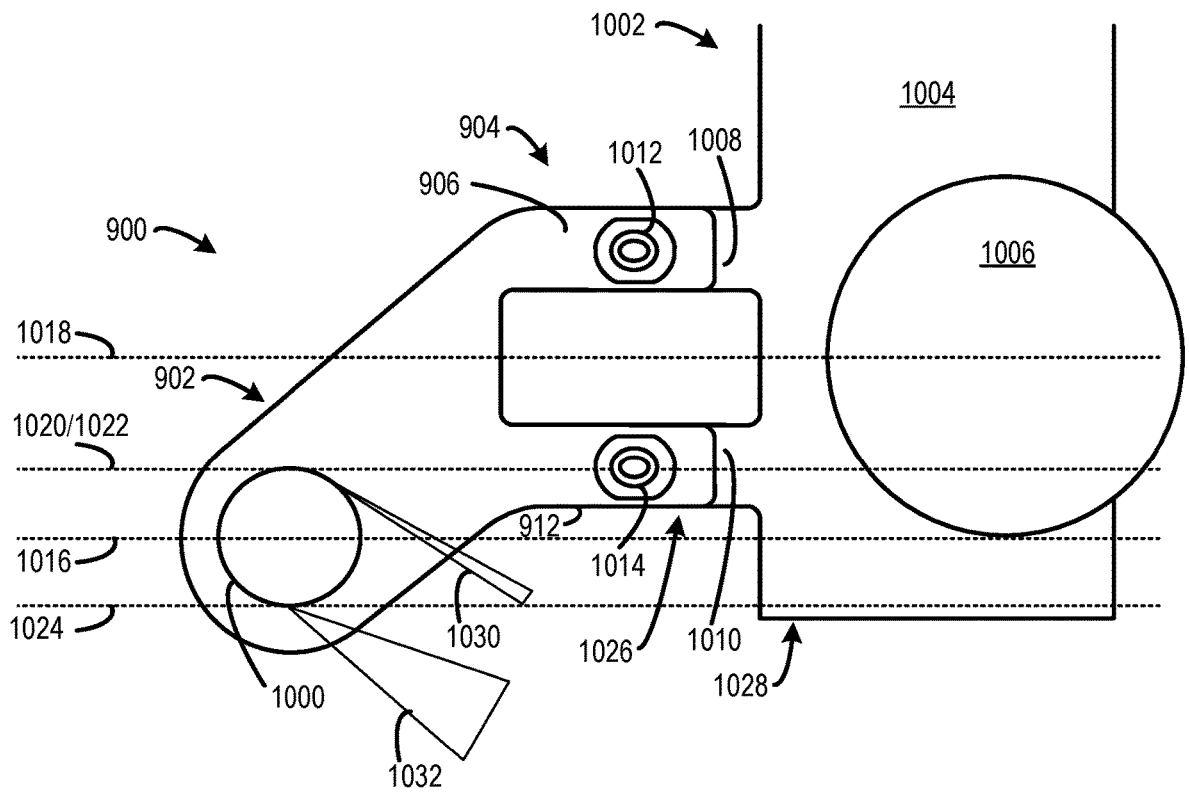

FIGS. 9-10 show an example embodiment of a tow bar fitting 900 that is similar in function to the tow bar fitting 106 shown in FIG. 3, the tow bar fitting 500 shown in FIGS. 5-6 and/or the tow bar fitting 700 shown in FIGS. 7-8, but differs in that the tow bar fitting 900 is configured to fasten to an aircraft landing gear having attachments configured to receive horizontal fasteners. Such attachments configured to receive horizontal fasteners may be provided on different models of aircraft, and thus the tow bar fitting 900 may be specifically configured to fasten to these models of aircraft. In FIG. 9, the tow bar fitting 900 is shown separate from the strut of the landing gear. In FIG. 10, the tow bar fitting 900 is shown fastened to the strut of the landing gear. In the depicted example, the landing gear is shown in simplified form with a single forward-facing tow bar fitting. In other examples, forward- and rear-facing tow bar fittings may be fastened to the strut of the landing gear.

The tow bar fitting 900 includes a clevis 902 and a mount 904 including upper and lower attachments configured to receive horizontal fasteners. The clevis 902 acts as a pin support for a tow pin 1000 (shown in FIG. 10). The mount 904 includes an upper attachment 906 having a first upper aperture 908 and a second upper aperture 910 horizontally spaced apart from the first upper aperture 908. The first and second upper apertures 908, 910 are coaxially aligned and configured to receive an upper horizontal fastener 1012 (shown in FIG. 10). The mount 904 includes a lower attachment 912 vertically spaced apart from the upper attachment 906. The upper attachment 906 and the lower attachment 912 are parallel with each other. The lower attachment 912 forms a first lower aperture 914 and a second lower aperture 916 horizontally spaced apart from the first lower aperture 914. The first and second lower apertures 914, 916 are coaxially aligned and configured to receive a lower horizontal fastener 1014 (shown in FIG. 10).

In FIG. 10, the tow bar fitting 900 is fastened to a landing gear 1002. The landing gear 1002 includes a strut 1004. An axle 1006 extends laterally way from the strut 1004 and is configured to support wheels rotatably coupled to the landing gear 1002. The strut 1004 includes an upper beam 1008 and a lower beam 1010 that extend perpendicular to the strut 1004. The upper beam 1008 is vertically spaced apart from the lower beam 1010. The upper beam 1008 forms an aperture that fits in between the first and second upper apertures 908, 910 formed in the upper attachment 906 of the tow bar fitting 900 such that the upper horizontal fastener 1012 can be inserted through all three of the apertures. The lower beam 1010 forms an aperture that fits in between the first and second lower apertures 914, 916 formed in the lower attachment 912 of the tow bar fitting 900 such that the lower horizontal fastener 1014 can be inserted through all three of the apertures. When the tow bar fitting 900 is fastened to the landing gear 1002 via the upper and lower horizontal fasteners 1012, 1014, the upper and lower attachments 906, 912 are substantially perpendicular to the strut 1004.

The tow bar fitting 900 is configured such that the clevis 902 extends from the mount 904 at a downward angle away from the landing gear 1002. The tow pin 1000 is positioned in the clevis 902 such that a tow pin plane 1016 that horizontally bisects the tow pin 1000 is lower than a mount plane 1018 that horizontally bisects the upper attachment 906 and the lower attachment 912 of the mount 904. Additionally, the tow pin 1000 is positioned in the clevis 902 such that the tow pin plane 1016 is lower than a lower attachment plane 1020 that horizontally bisects the lower attachment 912. Further, the tow pin 1000 is sized and positioned in the clevis 902 such that a top tow pin plane 1022 tangent to a top of the tow pin 1000 is lower than the mount plane 1018, and a bottom tow pin plane 1024 tangent to a bottom of the tow pin 1000 is lower than the lower attachment plane 1020. Stated another way, the tow pin plane 1016 is vertically offset from the mount plane 1018. The tow pin 1000 may be positioned such that the tow pin plane 1016 is vertically offset from the mount plane 1018 by any suitable distance.

The tow pin 1000 is positioned such that a majority of vortex shedding airflow passing under the tow pin 1000 generated responsive to forward movement of the aircraft flows under a bottom 1026 of the tow bar fitting 900 and under a bottom 1028 of the strut 1004 of the landing gear 1002. In particular, both a weak shear layer 1030 created by airflow separating from a top surface of the tow pin 1000 and a strong shear layer 1032 created by airflow separating from a bottom surface of the tow pin 1000 form vortex shedding that is directed below the bottom 1026 of the mount 904 and the bottom 1028 of the strut 1004. In this way, impingement of the vortex shedding on the mount 904 and the strut 1004 is reduced relative to a conventional configuration in which the tow pin is level with the front face of the mount thereby reducing noise due to vortex shedding airflow.

Figure 11:
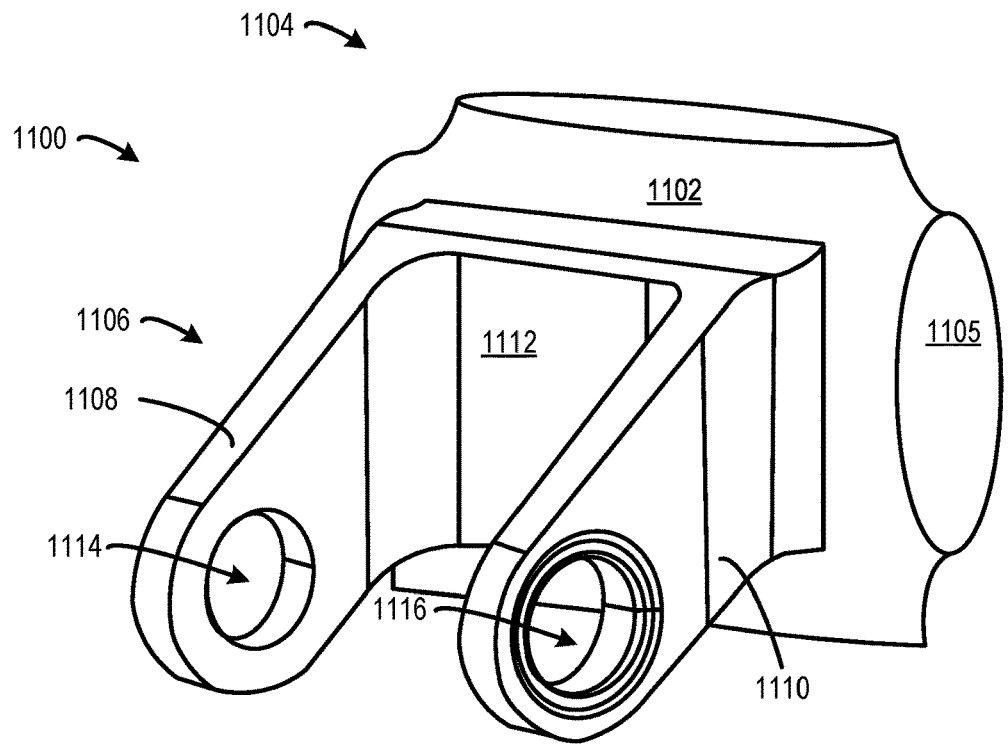
FIGS. 11-12 show an example embodiment of a tow bar fitting integrally formed with a strut of a landing gear.
Figure 12:
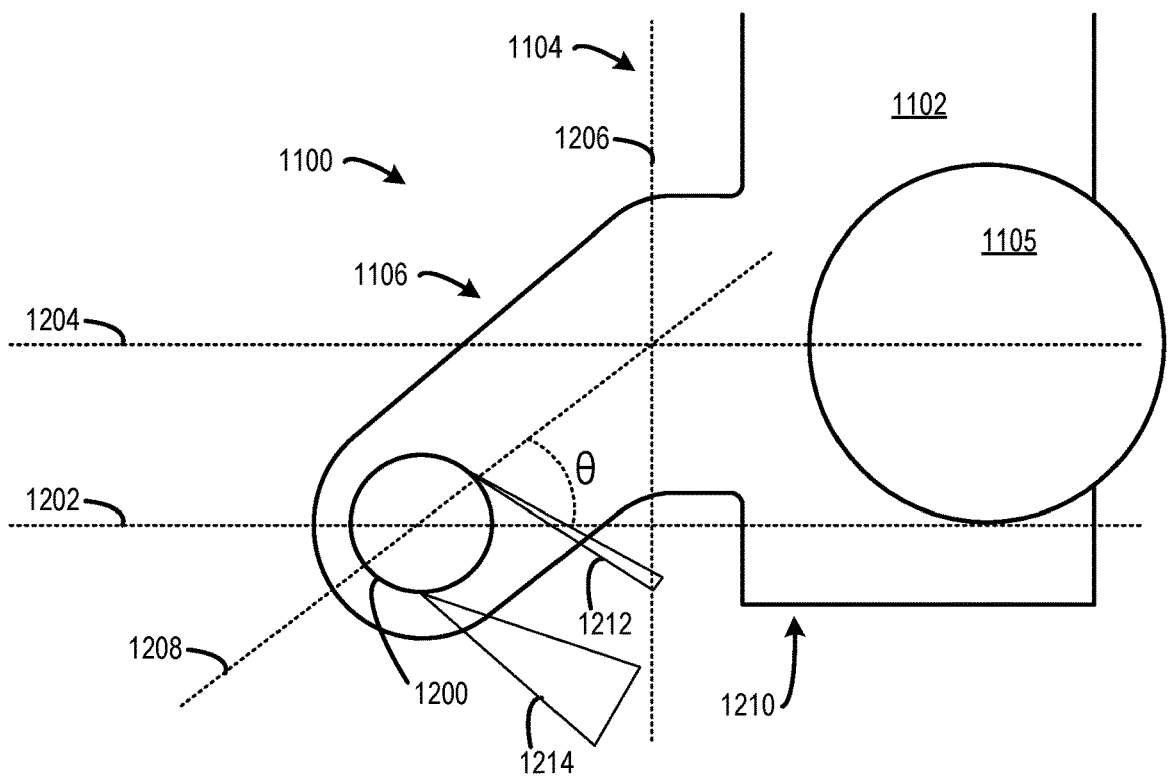

FIGS. 11-12 show an exemplary tow bar fitting 1100 that is similar in function to the tow bar fitting 106 shown in FIG. 3, the tow bar fitting 500 shown in FIGS. 5-6, the tow bar fitting 700 shown in FIGS. 7-8, and/or the tow bar fitting 900 shown in FIGS. 9-10, but differs in that the tow bar fitting 1100 is integrally formed with a strut 1102 of a landing gear 1104. In FIG. 11, a partial perspective view of a strut 1102 of a landing gear 1104 including the integrally formed tow bar fitting 1100. FIG. 12 shows a cross sectional view of the strut 1102 and two bar fitting 1100. In the depicted example, the landing gear 1104 is shown in simplified form with a single forward-facing tow bar fitting. In other examples, forward- and rear-facing tow bar fittings may be integrally formed with the strut of the landing gear. The depicted unitary configuration of the tow bar fitting and the strut may be beneficial by providing added strength to the tow bar fitting relative to a removable tow bar fitting configuration that may extend the operational lifespan of the component. Such increased strength is weighed against a lack of operational flexibility to swap out differently configured tow bar fittings.

The landing gear 1104 includes an axle 1105 that extends laterally away from the strut 1102 and is configured to support wheels rotatably coupled to the landing gear 1104. The tow bar fitting 1100 is positioned on the strut 1102 in substantial horizontal alignment with the axle 1105. The tow bar fitting 1100 includes a clevis 1106 that acts as a pin support for a tow pin 1200 (shown in FIG. 12). The clevis 1106 is U-shaped and includes a first prong 1108 and a second prong 1110 that extend downward away from a front face 1112 of the tow bar fitting 1100. A first tow pin aperture 1114 is formed in a terminal end of the first prong 1108 and a second tow pin aperture 1116 is formed in a terminal end of the second prong 1110. The first and second tow pin apertures 1114, 1116 are horizontally coaxially aligned and collectively configured to hold the tow pin 1200 in the tow bar fitting 1100.

The tow bar fitting 1100 is configured such that the first and second prongs 1108, 1110 of the clevis 1106 extend at a downward angle away from the landing gear 1104. A tow pin plane 1202 horizontally bisects the tow pin 1200. A mount plane 1204 bisects the mount 1100 attachment location on the strut 1102. A mount face plane 1206 is tangent to the front face 1112 of the mount 1100 and intersect the mount plane 1204. An angled plane 1208 passes through the intersection of the mount plane 1204 and the mount face plane 1206 and extends through a center of the tow pin 1200. The tow pin 1200 is vertically offset from the mount plane 1204 such that a downward angle (A) between the angled plane 1208 and the tow pin plane 1202 is at least 18° for a Category II aircraft according to SAE AS1614.

The tow pin 1200 is positioned such that a majority of vortex shedding airflow passing under the tow pin 1200 generated responsive to forward movement of the aircraft flows under a bottom 1210 of the strut 1102 of the landing gear 1104. In particular, both a weak shear layer 1212 created by airflow separating from a top surface of the tow pin 1200 and a strong shear layer 1214 created by airflow separating from a bottom surface of the tow pin 1200 form vortex shedding that is directed below the bottom 1210 of the strut 1102. In this way, impingement of the vortex shedding on the strut 1102 is reduced relative to a conventional configuration in which the tow pin is level with the front face of the mount thereby reducing noise due to vortex shedding airflow.

The tow bar fitting 1100 may be formed integral with the strut 1102 in any suitable manner. In one example, the tow bar fitting 1100 may be welded to the strut 1102. In another example, the tow bar fitting 1100 may be co-molded with at least a portion of the strut 1102.

FIGS. 13-16 show different embodiments of fork-type tow bar fittings having different mounts. Fork-type tow bar fittings may be beneficial for aircraft landing gear configurations where there is minimal side clearance between the inner sidewalls of the wheels and the pin supports of the tow bar fitting. In particular, the fork-type tow bar fitting allows the tow pin to be installed/removed from a front of the tow bar fitting. In contrast, clevis-type tow bar fittings require suitable clearance on the side to slide the tow pin into the apertures of the clevis.

Figure 13:
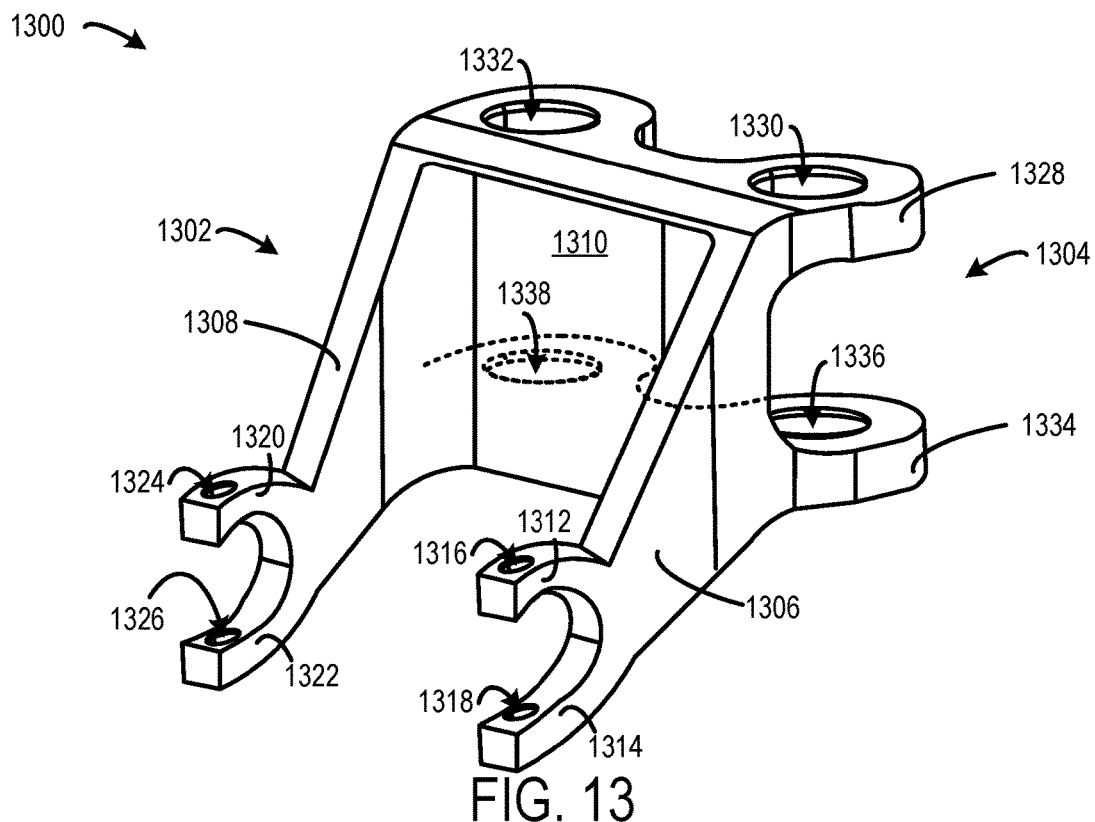
FIGS. 13-14 show an example embodiment of a tow bar fitting including a forked pin support and a mount including upper and lower attachments configured to receive vertical fasteners.
Figure 14:
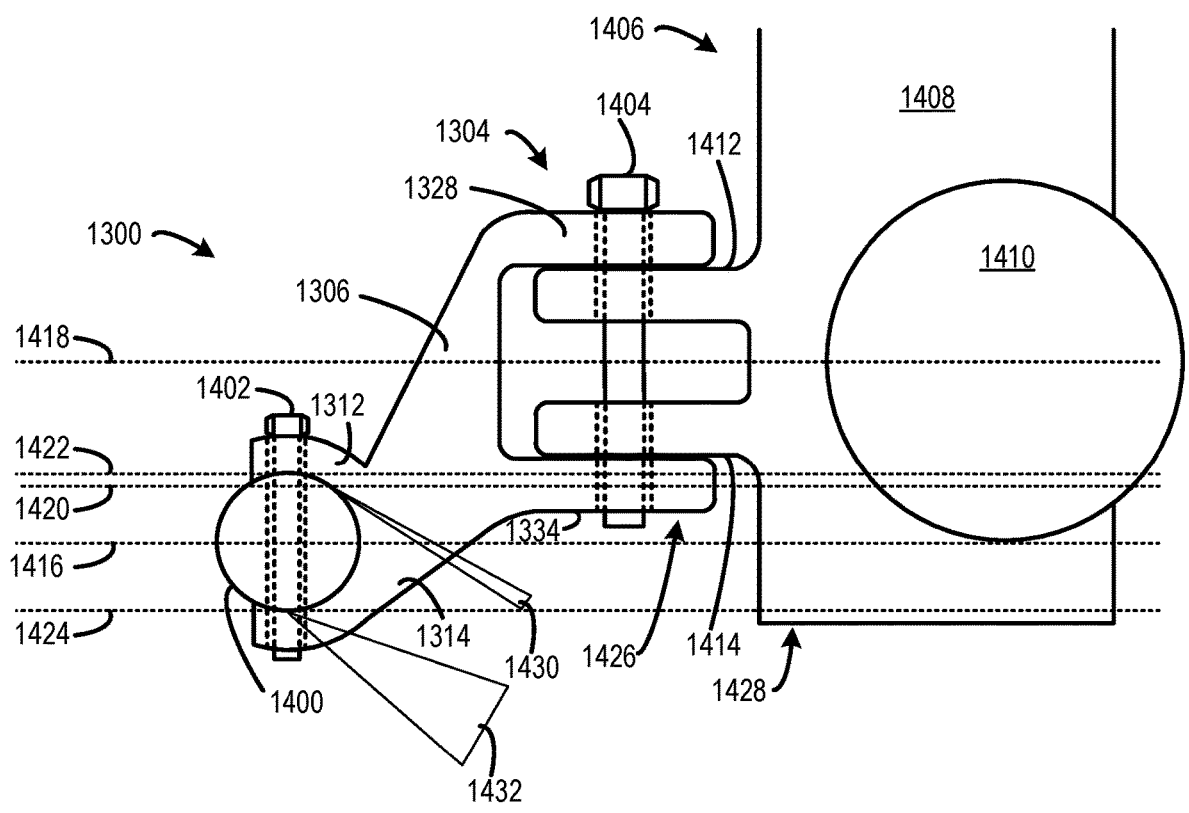

FIGS. 13-14 show an exemplary tow bar fitting 1300 including a fork-type pin support 1302 and a mount 1304 including upper and lower attachments configured to receive vertical fasteners. Such attachments configured to receive vertical fasteners may be provided on different models of aircraft, and thus the tow bar fitting 1300 may be specifically configured to fasten to these models of aircraft. In FIG. 13, the tow bar fitting 1300 is shown separate from the strut of the landing gear. In FIG. 14, the tow bar fitting 1300 is shown fastened to the strut of the landing gear. In the depicted example, the landing gear is shown in simplified form with a single forward-facing tow bar fitting. In other examples, forward- and rear-facing tow bar fittings may be fastened to the strut of the landing gear.

The pin support 1302 includes a first fork 1306 and a second fork 1308 that extend downward away from a front face 1310 of the mount 1304. The first fork 1306 includes a first upper tine 1312 and a first lower tine 1314. The first upper tine 1312 forms a first upper tow pin aperture 1316. The first lower tine 1314 forms a first lower tow pin aperture 1318. The first upper tow pin aperture 1316 and the first lower tow pin aperture 1318 are configured to receive a first vertical tow pin fastener 1402 that passes through an aperture in a tow pin 1400 (shown in FIG. 14) to retain the tow pin 1400 in the first fork 1306. The second fork 1308 includes a second upper tine 1320 and a second lower tine 1322. The second upper tine 1320 forms a second upper tow pin aperture 1324. The second lower tine 1322 forms a second lower tow pin aperture 1326. The second upper tow pin aperture 1324 and the second lower tow pin aperture 1326 are configured to receive a second vertical tow pin fastener (not shown) that passes through an aperture in the tow pin 1400 (shown in FIG. 14) to retain the tow pin 1400 in the second fork 1308.

The mount 1304 includes an upper attachment 1328 having a first upper aperture 1330 and a second upper aperture 1332 horizontally spaced apart from the first upper aperture 1330. The mount 1304 includes a lower attachment 1334 vertically spaced apart from the upper attachment 1328. The upper attachment 1328 and the lower attachment 1334 are parallel with each other. The lower attachment 1334 forms a first lower aperture 1336 and a second lower aperture 1338 horizontally spaced apart from the first lower aperture 1336. The first upper aperture 1330 and the first lower aperture 1336 are vertically spaced apart and coaxially aligned, such that the first upper aperture 1330 and the first lower aperture 1336 are collectively configured to receive a first vertical fastener 1404 (shown in FIG. 14). The second upper aperture 1332 and the second lower aperture 1338 are vertically spaced apart and coaxially aligned, such that the second upper aperture 1332 and the second lower aperture 1338 are collectively configured to receive a second vertical fastener (not shown).

In FIG. 14, the tow bar fitting 1300 is fastened to a landing gear 1406. The landing gear 1406 includes a strut 1408. An axle 1410 extends laterally way from the strut and is configured to support wheels rotatably coupled to the landing gear 1406. The strut 1408 includes an upper beam 1412 and a lower beam 1414 that extend perpendicular to the strut 1408. The upper beam 1412 and the lower beam 1414 are vertically spaced apart such that the upper and lower beams are sandwiched in between the upper attachment 1328 and the lower attachment 1334. The upper and lower beams 1412, 1414 form apertures that align with the apertures formed in the upper and lower attachments 1328, 1334 of the tow bar fitting 1300 such that vertical fasteners 1404 can be inserted through the apertures to affix the tow bar fitting 1300 to the landing gear 1406. The vertical fasteners 1404 may be retained in the upper and lower attachments in any suitable manner. When the tow bar fitting 1300 is fastened to the landing gear 1406, the upper and lower attachments 1328, 1334 are substantially perpendicular to the strut 1408.

The tow bar fitting 1300 is configured such that the first and second forks 1306, 1308 extend from the mount 1304 at a downward angle away from the landing gear 1406. The tow pin 1400 is positioned in the first and second forks 1306, 1308 such that a tow pin plane 1416 that horizontally bisects the tow pin 1400 is lower than a mount plane 1418 that horizontally bisects the upper attachment 1328 and the lower attachment 1334 of the mount 1304. In the illustrated embodiment, the mount plane 1418 also horizontally bisects the axle 1410. In other embodiments, the mount plane 1418 may be positioned above or below a center of the axle 1410. Additionally, the tow pin 1400 is positioned in the first and second forks 1306, 1308 such that the tow pin plane 1416 is lower than a lower attachment plane 1420 that horizontally bisects the lower attachment 1334. Further, the tow pin 1400 is sized and positioned in the first and second forks 1306, 1308 such that a top tow pin plane 1422 tangent to a top of the tow pin 1400 is lower than the mount plane 1418, and a bottom tow pin plane 1424 tangent to a bottom of the tow pin

1400 is lower than the lower attachment plane 1420. Stated another way, the tow pin plane 1416 is vertically offset from the mount plane 1418. The tow pin 1400 may be positioned such that the tow pin plane 1416 is vertically offset from the mount plane 1418 by any suitable distance. In one example, the tow pin plane 1416 is at least 2 inches lower than the mount plane 1418.

The tow pin 1400 is positioned such that a majority of vortex shedding airflow passing under the tow pin 1400 generated responsive to forward movement of the aircraft flows under a bottom 1426 of the tow bar fitting 1300 and under a bottom 1428 of the strut 1408 of the landing gear 1406. In particular, both a weak shear layer 1430 created by airflow separating from a top surface of the tow pin 1400 and a strong shear layer 1432 created by airflow separating from a bottom surface of the tow pin 1400 form vortex shedding that is directed below the bottom 1426 of the mount 1304 and the bottom 1428 of the strut 1408. In this way, impingement of the vortex shedding on the front face 1310 of the mount 1304 and the strut 1408 is reduced relative to a conventional configuration in which the tow pin is level with the front face of the mount thereby reducing noise due to vortex shedding airflow.

Figure 15:
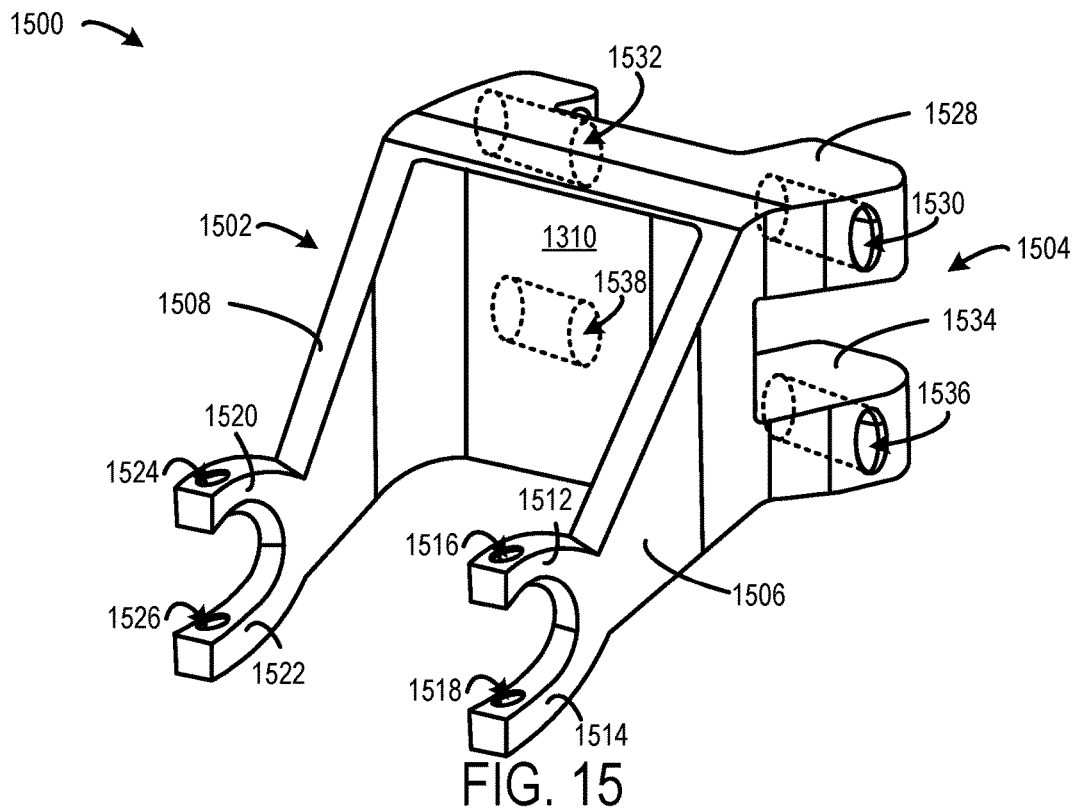
FIGS. 15-16 show an example embodiment of a tow bar fitting including a forked pin support and a mount including upper and lower attachments configured to receive horizontal fasteners.
Figure 16:
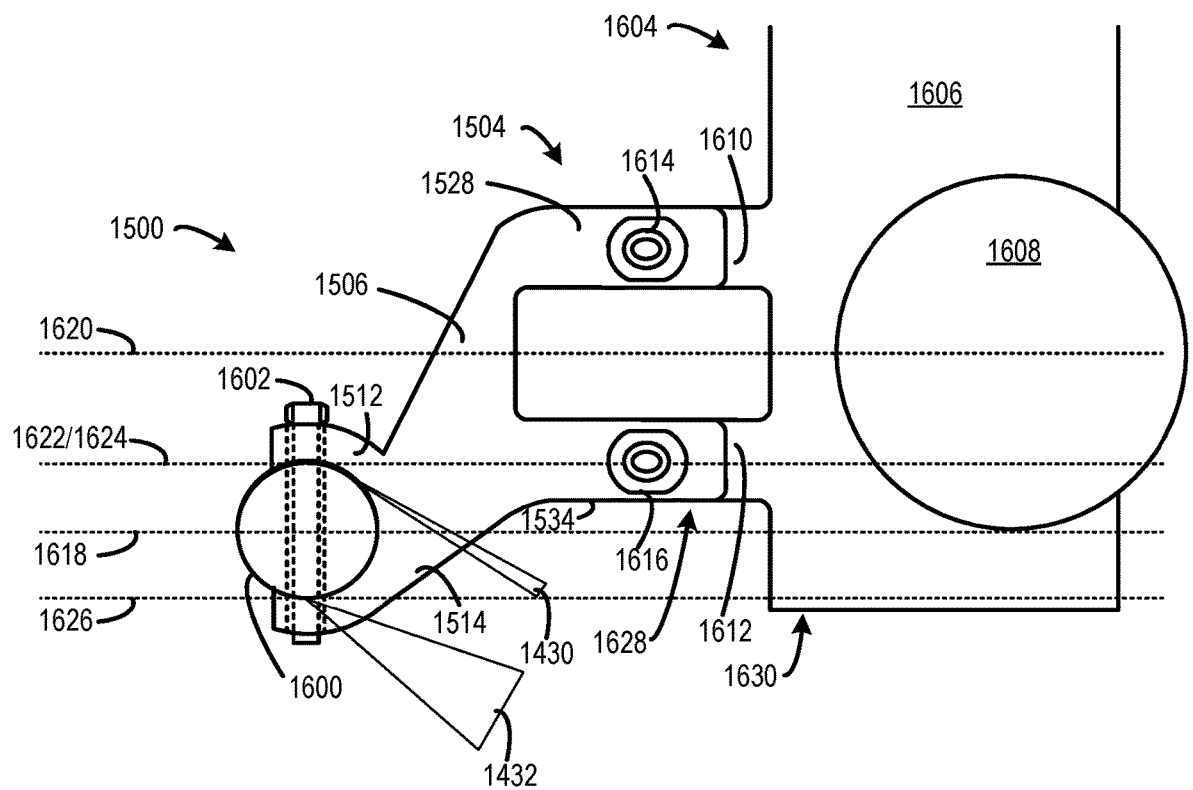

FIGS. 15-16 show an exemplary tow bar fitting 1500 that is similar in function to the tow bar fitting 1300 shown in FIGS. 13-14, but differs in that the tow bar fitting 1500 is configured to fasten to an aircraft landing gear having attachments configured to receive horizontal fasteners. Such attachments configured to receive horizontal fasteners may be provided on different models of aircraft, and thus the tow bar fitting 1500 may be specifically configured to fasten to these models of aircraft. In FIG. 15, the tow bar fitting 1500 is shown separate from the strut of the landing gear. In FIG. 16, the tow bar fitting 1500 is shown fastened to the strut of the landing gear. In the depicted example, the landing gear is shown in simplified form with a single forward-facing tow bar fitting. In other examples, forward- and rear-facing tow bar fittings may be fastened to the strut of the landing gear.

The tow bar fitting 1500 includes a fork-type pin support 1502 and a mount 1504 including upper and lower attachments configured to receive horizontal fasteners. The pin support 1502 includes a first fork 1506 and a second fork 1508 that extend downward away from a front face 1510 of the mount 1502. The first fork 1506 includes a first upper tine 1512 and a first lower tine 1514. The first upper tine 1512 forms a first upper tow pin aperture 1516. The first lower tine 1514 forms a first lower tow pin aperture 1518. The first upper tow pin aperture 1516 and the first lower tow pin aperture 1518 are configured to receive a first vertical tow pin fastener 1602 that passes through an aperture in a tow pin 1600 (shown in FIG. 16) to retain the tow pin 1600 in the first fork 1506. The second fork 1508 includes a second upper tine 1520 and a second lower tine 1522. The second upper tine 1520 forms a second upper tow pin aperture 1524. The second lower tine 1522 forms a second lower tow pin aperture 1526. The second upper tow pin aperture 1524 and the second lower tow pin aperture 1526 are configured to receive a second vertical tow pin fastener (not shown) that passes through an aperture in the tow pin 1400 (shown in FIG. 14) to retain the tow pin 1400 in the second fork 1508.

The mount 1504 includes an upper attachment 1528 having a first upper aperture 1530 and a second upper aperture 1532 horizontally spaced apart from the first upper aperture 1530. The first and second upper apertures 1530, 1532 are coaxially aligned and configured to receive an upper horizontal fastener 1614 (shown in FIG. 16). The mount 1504 includes a lower attachment 1534 vertically spaced apart from the upper attachment 1528. The upper attachment 1528 and the lower attachment 1534 are parallel with each other. The lower attachment 1534 forms a first lower aperture 1536 and a second lower aperture 1538 horizontally spaced apart from the first lower aperture 1536. The first and second lower apertures 1536, 1538 are coaxially aligned and configured to receive a lower horizontal fastener 1616 (shown in FIG. 10).

In FIG. 16, the tow bar fitting 1500 is fastened to a landing gear 1604. The landing gear 1604 includes a strut 1606. An axle 1608 extends laterally away from the strut 1606 and is configured to support wheels rotatably coupled to the landing gear 1002. The strut 1606 includes an upper beam 1610 and a lower beam 1612 that extend perpendicular to the strut 1606. The upper beam 1610 is vertically spaced apart from the lower beam 1612. The upper beam 1610 forms an aperture that fits in between the first and second upper apertures 1530, 1532 formed in the upper attachment 1528 of the tow bar fitting 1500 such that the upper horizontal fastener 1614 can be inserted through all three of the apertures. The lower beam 1612 forms an aperture that fits in between the first and second lower apertures 1536, 1538 formed in the lower attachment 1534 of the tow bar fitting 1500 such that the lower horizontal fastener 1616 can be inserted through all three of the apertures. When the tow bar fitting 1500 is fastened to the landing gear 1604 via the upper and lower horizontal fasteners 1614, 1616, the upper and lower attachments 1528, 1534 are substantially parallel with the strut 1606.

The tow bar fitting 1500 is configured such that the first and second forks 1506, 1508 extend from the mount 1504 at a downward angle away from the landing gear 1604. The tow pin 1600 is positioned in the first and second forks 1506, 1508 such that a tow pin plane 1618 that horizontally bisects the tow pin 1600 is lower than a mount plane 1620 that horizontally bisects the upper attachment 1528 and the lower attachment 1534 of the mount 1504. Additionally, the tow pin 1600 is positioned in the first and second forks 1506, 1508 such that the tow pin plane 1618 is lower than a lower attachment plane 1622 that horizontally bisects the lower attachment 1534. Further, the tow pin 1600 is sized and positioned in the first and second forks 1506, 1508 such that a top tow pin plane 1624 tangent to a top of the tow pin 1600 is lower than the mount plane 1620, and a bottom tow pin plane 1626 tangent to a bottom of the tow pin 1600 is lower than the lower attachment plane 1622. Stated another way, the tow pin plane 1618 is vertically offset from the mount plane 1620. The tow pin 1600 may be positioned such that the tow pin plane 1618 is vertically offset from the mount plane 1620 by any suitable distance.

The tow pin 1600 is positioned such that a majority of vortex shedding airflow passing under the tow pin 1600 generated responsive to forward movement of the aircraft flows under a bottom 1628 of the tow bar fitting 1500 and under a bottom 1630 of the strut 1606 of the landing gear 1604. In particular, both a weak shear layer 1632 created by airflow separating from a top surface of the tow pin 1600 and a strong shear layer 1634 created by airflow separating from a bottom surface of the tow pin 1600 form vortex shedding that is directed below the bottom 1628 of the mount 1504 and the bottom 1630 of the strut 1606. In this way, impingement of the vortex shedding on the mount 1504 and the strut 1606 is reduced relative to a conventional configuration in which the tow pin is level with the front face of the mount thereby reducing noise due to vortex shedding airflow.

The fork-type tow bar fittings shown in FIGS. 13-16 are provided as non-limiting examples. It will be appreciated that a fork-type tow bar fitting may be fastened to a landing gear in any suitable manner. In other embodiments, a fork-type tow bar fitting may be fastened to a landing gear via angled fasteners in a configuration similar to the embodiment shown in FIGS. 7-8. In still other embodiments, a fork-type tow bar fitting may be formed integrally with a landing gear in a configuration similar to the embodiment shown in FIGS. 11-12.

Various components of the tow bar fitting may be differently configured in different embodiments. For example, different embodiments of the tow bar fitting may be fastened to the strut of the landing gear differently (e.g., using vertical fasteners, using horizontal fasteners, using angled fasteners, welded, co-molded), the tow pin may be retained in the tow bar fitting differently (e.g., clevis, forks), and/or the tow pin may be positioned differently (e.g., different downward angles, different vertical offsets). A tow bar fitting may include any suitable combination of different components and/or features without departing from the spirit of this disclosure. Furthermore, a tow bar fitting may be configured to be fastened to any suitable type of aircraft for towing of that aircraft via an external power source.

In some embodiments, it may be determined, e.g., via wind tunnel testing, that a desired level of noise reduction may be obtained by positioning the tow pin such that a majority of vortex shedding airflow passing under the tow pin will flow under a bottom of the tow bar fitting and/or under a bottom of a landing gear strut. In other embodiments, even greater noise reduction may be achieved by further lowering the tow pin such that an increased percentage of vortex shedding airflow flows under the tow bar fitting and/or landing gear strut (e.g., 60%, 75%, or even 100%).

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A tow bar fitting for towing an aircraft, comprising:
a mount including an upper attachment and a lower attachment for affixing the tow bar fitting to a landing gear of the aircraft;
a pin support extending from the mount away from the landing gear; and
a tow pin positioned in the pin support such that a tow pin plane that horizontally bisects the tow pin is lower than a mount plane that horizontally bisects the upper attachment and the lower attachment when the aircraft is right-side-up on the ground.

2. The tow bar fitting of claim 1, wherein forward movement of the aircraft when the landing gear is lowered generates vortex shedding airflow that passes under the tow pin, and wherein the tow pin is positioned in the pin support such that a majority of the vortex shedding airflow passing under the tow pin flows under a bottom of the tow bar fitting.

3. The tow bar fitting of claim 1, wherein forward movement of the aircraft when the landing gear is lowered generates vortex shedding airflow that passes under the tow pin, and wherein the tow pin is positioned in the pin support such that a majority of the vortex shedding airflow passing under the tow pin flows under a bottom of a strut of the landing gear.

4. The tow bar fitting of claim 1, wherein the pin support includes a clevis.

5. The tow bar fitting of claim 1, wherein the pin support includes a first fork and a second fork.

6. The tow bar fitting of claim 1, wherein the upper attachment includes a first upper aperture horizontally spaced apart from a second upper aperture; wherein the lower attachment includes a first lower aperture horizontally spaced from a second lower aperture; wherein the first upper aperture and the first lower aperture are aligned to receive a first vertical fastener; and wherein the second upper aperture and the second lower aperture are aligned to receive a second vertical fastener.

7. The tow bar fitting of claim 1, wherein the upper attachment includes horizontally spaced apart upper apertures configured to receive an upper horizontal fastener; and the lower attachment includes horizontally spaced apart lower apertures configured to receive a lower horizontal fastener.

8. The tow bar fitting of claim 1, wherein the tow pin plane is lower than a lower attachment plane that horizontally bisects the lower attachment.

9. The tow bar fitting of claim 1, wherein the tow pin plane is lower than the mount plane by at least a distance equal to half of a diameter of the tow pin.

10. The tow bar fitting of claim 1, wherein a top tow pin plane tangent to a top of the tow pin is lower than the mount plane.

11. The tow bar fitting of claim 1, wherein a bottom tow pin plane tangent to a bottom of the tow pin is lower than a lower attachment plane that horizontally bisects the lower attachment.

12. A tow bar fitting for towing an aircraft, comprising:
a mount for affixing the tow bar fitting to a strut of a landing gear of the aircraft;
a pin support extending from the mount at a downward angle away from the strut when the aircraft is right-side-up on the ground; and
a tow pin positioned in the pin support.

13. The tow bar fitting of claim 12, wherein forward movement of the aircraft when the landing gear is lowered generates vortex shedding airflow that passes under the tow pin, and wherein the tow pin is positioned in the pin support such that a majority of vortex shedding airflow passing under the tow pin flows under a bottom of the tow bar fitting.

14. The tow bar fitting of claim 12, wherein the downward angle is at least 18 degrees from horizontal.

15. The tow bar fitting of claim 12, wherein the pin support includes a clevis.

16. The tow bar fitting of claim 12, wherein the pin support includes first and second forks.

17. A landing gear for an aircraft, comprising:
a strut;
an axle extending laterally from the strut and configured to support a first wheel and a second wheel; and
a tow bar assembly positioned on the strut between the first wheel and the second wheel, the tow bar assembly including:
a pin support extending at a downward angle away from the strut; and
a tow pin positioned in the pin support.

18. The landing gear of claim 17, wherein the pin support is integrally formed with the strut.

19. The landing gear of claim 17, wherein the tow bar assembly includes a mount for affixing the tow bar assembly to the strut via one or more fasteners.

20. The landing gear of claim 17, wherein forward movement of the aircraft when the landing gear is lowered generates vortex shedding airflow that passes under the tow pin, and wherein the tow pin is positioned in the pin support such that a majority of the vortex shedding airflow passing under the tow pin flows under a bottom of the tow pin.

* * * * *